(12) United States Patent
Blair

(10) Patent No.: US 7,014,250 B2
(45) Date of Patent: Mar. 21, 2006

(54) ICE FISHING SHELTER

(76) Inventor: Daniel Blair, 156 Van Buren St., Warwick, RI (US) 02888

( * ) Notice: Subject to any disclaimer, the term of this patent is extended or adjusted under 35 U.S.C. 154(b) by 0 days.

(21) Appl. No.: 11/051,956

(22) Filed: Feb. 4, 2005

(65) Prior Publication Data

US 2005/0173944 A1  Aug. 11, 2005

Related U.S. Application Data

(60) Provisional application No. 60/542,778, filed on Feb. 6, 2004.

(51) Int. Cl.
*B60P 3/345* (2006.01)
(52) U.S. Cl. .................................................. 296/164
(58) Field of Classification Search ................ 296/164, 296/159, 176, 24.32
See application file for complete search history.

(56) References Cited

U.S. PATENT DOCUMENTS

| | | | | |
|---|---|---|---|---|
| 3,473,839 A | * | 10/1969 | Elble | 296/157 |
| 3,522,967 A | * | 8/1970 | Platt | 296/157 |
| 3,622,193 A | * | 11/1971 | Schmidt | 296/164 |
| 3,635,515 A | * | 1/1972 | White et al. | 296/164 |
| 3,652,119 A | * | 3/1972 | Hall | 296/164 |
| 4,263,925 A | | 4/1981 | Arganbright | 135/1 A |
| 4,294,484 A | * | 10/1981 | Robertson | 296/156 |
| 4,465,316 A | | 8/1984 | Roisen | 296/161 |
| 4,470,228 A | * | 9/1984 | Dirck | 52/106 |
| 4,542,933 A | * | 9/1985 | Bischoff | 296/164 |
| 5,339,852 A | * | 8/1994 | Bull | 135/87 |
| 5,341,588 A | | 8/1994 | Lizotte | 43/1 |
| 5,383,702 A | * | 1/1995 | Matheson | 296/157 |
| 5,954,076 A | | 9/1999 | McGinnis | 135/88.13 |
| 6,155,279 A | | 12/2000 | Humphrey | 135/87 |
| 6,397,870 B1 | | 6/2002 | Makedonsky et al. | 135/116 |
| 6,802,327 B1 | | 10/2004 | Koss | 135/88.08 |

\* cited by examiner

*Primary Examiner*—H. Gutman
(74) *Attorney, Agent, or Firm*—Barlow, Josephs & Holmes, Ltd.

(57) ABSTRACT

A portable structure for use in ice fishing. A two-piece structure that generally includes a lower shell and a separate removable hard cover shell that is installed onto the lower shell is provided. Further, the lower shell is formed as a hull, having a floor surrounded by exterior sidewalls to define an interior well within the lower shell. The cover unit is interfittingly received onto the walls of the sidewalls of the lower shell to complete the enclosure. The separability of the lower shell and the cover allow easy removal of the cover. When being transported, the cover of the shelter is removed, inverted and placed within the lower shell.

7 Claims, 4 Drawing Sheets

ICE FISHING SHELTER

CROSS-REFERENCE TO RELATED APPLICATIONS

This application is related to and claims priority from earlier filed U.S. Provisional Patent Application No. 60/542,778, filed Feb. 6, 2004, the contents of which are incorporated herein by reference.

BACKGROUND OF THE INVENTION

The present invention relates generally to portable shelters. More specifically, the present invention relates to a portable shelter that is particularly suited for ice fishing activities while being easily transported and having sufficient structure and mass to adequately protect the inhabitant from the inclement weather conditions generally associated with ice fishing.

The sport of ice fishing has become extremely popular in recent times. Since ice fishing is performed outdoors in generally difficult weather conditions, the ice-fisherman usually requires some sort of shelter from the elements. Therefore, with the increase in popularity of ice fishing, there has been a corresponding increase in the demand for ice fishing shelters. To fill this need, sportsmen have historically used small huts or shelters for protection against adverse weather conditions often associated with winter sports such as ice fishing. In particular, ice fishermen customarily build small, ice fishing shacks on the surface of a frozen pond or lake and then fish through a hole cut through the ice within the shack or immediately adjacent the shack. A typical ice fishing hut is relatively large and is not portable. The shelter is constructed much like a garden shed utilizing well known wood framing techniques. Due to the cumbersome nature of this type construction, generally the shelter must be erected in place on the ice of a frozen lake, then disassembled and removed at the end of the ice fishing season.

In an attempt to overcome the lack of portability, there are numerous and diverse portable ice fishing shelters disclosed in the prior art. Portable shelters provide an alternative to conventional ice fishing huts or shanties. Portable ice fishing shelters typically found in the prior art generally resemble tents which can be erected at the ice fishing site. For example, U.S. Pat. No. 5,954,076 discloses a tent structure that is configured to be erected in truck beds. The structure is simply an arrangement of tent poles with a fabric shell stretched over the poles. Similarly, U.S. Pat. No. 4,263,925 provides tent poles that are erected by inserting the poles into stake wells typically found in the side walls of most pick-up trucks. Again, the frame, once erected is then covered with a fabric shell.

To reduce the dependency on the pick-up truck structure as a key supporting element for such temporary structures, U.S. Pat. No. 5,341,588 discloses a portable structure that has a bottom platform onto which tent poles are erected and again a fabric shell is stretched over the poles. Skids are provided on the underside of the bottom platform to facilitate sliding of the shelter to the desired location. Similarly, other portable shelters have been proposed which combine the features of a collapsible hut with a sled for transporting the unit over the ice such as the device shown in U.S. Pat. No. 6,397,870. This device also includes a bottom hull member that allows the unit to float in the event that the ice breaks. Still other collapsible portable shelters have been proposed wherein the unit is turned on end prior to use.

The difficulty is that such prior art portable, collapsible shelters suffer from a variety of disadvantages. While all of the aforementioned prior art constructions are more than adequate for the basic purpose and function for which they have been specifically designed, they are uniformly deficient with respect to their failure to provide a simple, efficient, practical and safe portable shelter that can be transported to and from a fishing spot while requiring a minimal amount of effort to erect and maintain the shelter once in position. Additionally, while the presently available ice fishing shelters are somewhat successful, another shortcoming is that they generally provide only enough space to comfortably seat one occupant in the shelter.

Another shortcoming in the prior art is that If more than one fisherman is going on the expedition, several shelters must be provided, or a single shelter that is extremely cumbersome and unwieldy to transport, set up and use must be provided. Such means of accommodating plural fisherman can also be expensive. U.S. Pat. Nos. 6,155,279 and 4,465,316 both disclose such structures. The devices are generally bulky and while means are provided to remove the structures from the pick-up truck bed are provided, they are generally intended to be set in place in the pick-up truck and used in conjunction therewith. Further, these structures are large and in order to provide sufficient head room for the occupants of the structure, the structure must necessarily extend well above the roof line of the pick-up truck in which they are transported providing undesirable windage against these surfaces when transporting the structure over long distances.

Further, as most people who engage in ice fishing are all too well aware, variable ice conditions represent a very real and potential deadly danger that every year claims the lives of several participants in this otherwise enjoyable sport. There is only one prior art portable shelter construction that is designed to keep the occupant of the shelter afloat when faced with catastrophic ice failure and this shelter is limited to a single occupant.

Accordingly, as a consequence of the foregoing situation, there has existed a longstanding need for a new and improved type of portable ice fishing shelter that provides a safe and secure buoyant shelter that substantially envelops the occupant of the shelter in the event of an ice failure and accommodated several occupants at a time. There is yet a further need for a portable ice fishing shelter that can accommodate more than one fisherman and all of the necessary gear, yet is easily stored, set up and transported.

BRIEF SUMMARY OF THE INVENTION

In this regard, the present invention provides for novel portable structure that is particularly suited for use in ice fishing. The general purpose of the present invention, which will be described subsequently in greater detail, is to provide a new and improved two piece structure that is particularly tailored for use as a portable ice fishing shelter. The structure's construction generally includes a lower shell and a separate removable cover unit installed onto the lower shell. Further, the lower shell is formed as a hull member having a floor surrounded by exterior sidewalls to define an interior well within the lower shell member. The cover unit is interfittingly received onto the walls of the sidewalls of the lower shell to complete the enclosure. The separability of the lower shell and the cover allow easy removal of the cover. When being transported, it is anticipated that the cover of the shelter be removed, inverted and placed within the lower shell thereby reducing the vertical exposure of the structure during transport as well as reducing the overall volume of space necessary for storing the shelter when not in use. Also, the construction of the shelter provides that when the two pieces are joined together a rigid lightweight structure is created that is capable of floating itself and its occupants in the event of an ice failure.

To further enhance the portability of the shelter of the present invention, the lower shell includes indentations along the lower sides thereof. These indentations serve two purposes. On the exterior, the indentations correspond to the location of the standard wheel well positions in a pickup truck bed. Accordingly the lower shell is configured and sized to be received into a pickup truck for easy transportation without having to disassemble the structure. Further, these areas also serve as convenient seating areas for the occupants within the structure when the structure is in use. The lower shell may also include an internal chamber for convenient storage of other items, such as fishing equipment.

While the present structure is preferably constructed of a fiberglass or molded thermoplastic material, it is also anticipated that laminated and sealed plywood material, Plexiglas or any other suitable material may also be used and fall within the spirit of the present disclosure.

It is therefore an object of the present invention to provide a sturdy and portable ice fishing shelter that is capable of protecting a plurality of users from the environmental conditions encountered while ice fishing. It is a further object of the present invention to provide an ice fishing shelter that can accommodate a plurality of users while being easily portable and reducible in size for transport and storage. It is yet a further object of the present invention to provide a portable ice fishing shelter that can accommodate a plurality of users and is tailored to interface with a pick-up truck bed whereby the device can be stored and easily transported to and from the ice fishing location. It is still a further object of the present invention to provide an ice fishing structure that enhances the safety of the users by serving as a flotation device in the event of catastrophic ice failure.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
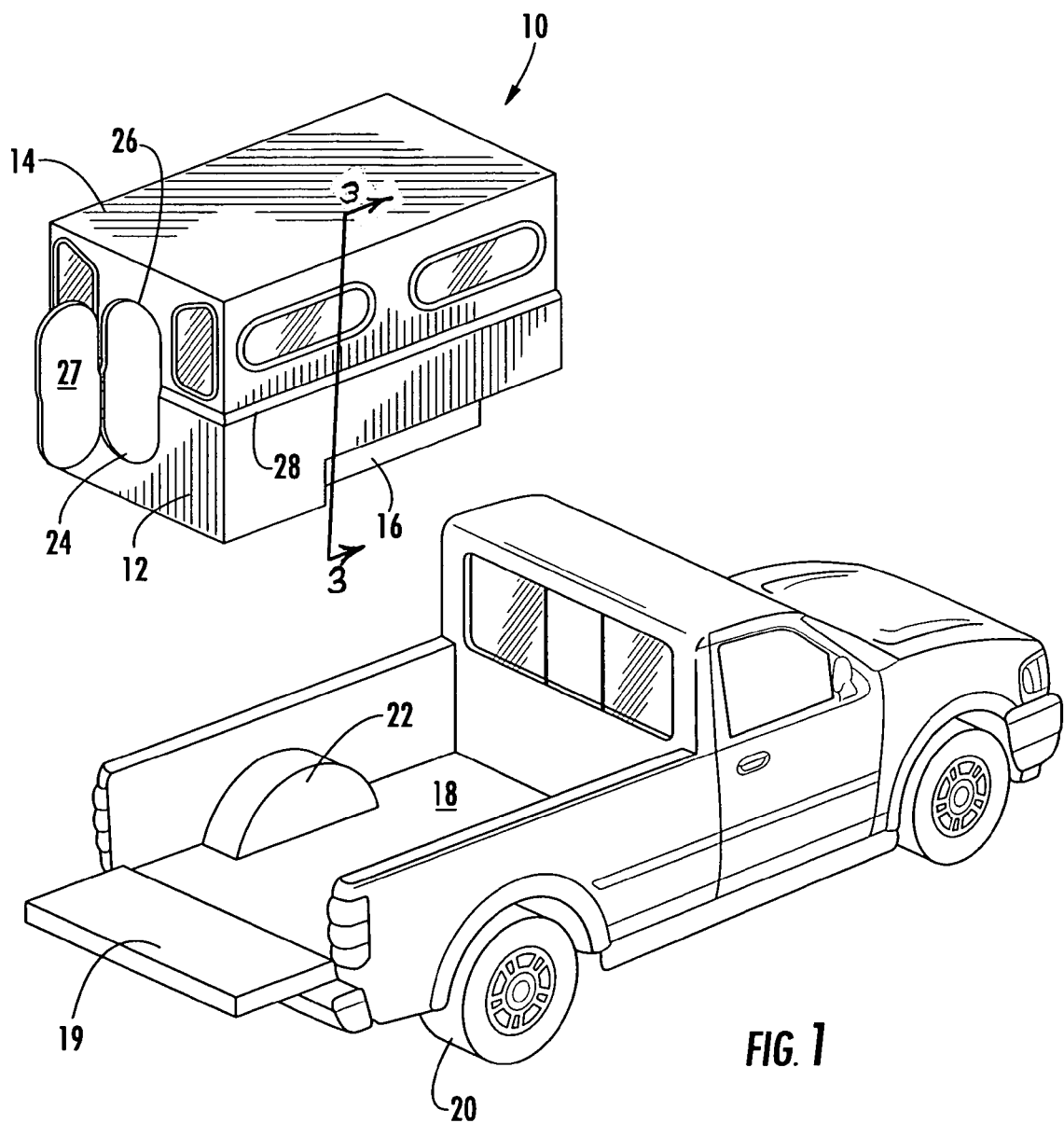
FIG. 1 is a perspective view of the portable ice fishing shelter of the present invention.

Now referring to the drawings, the portable ice fishing structure 10 of the present invention is shown and generally illustrated in the figures. The portable shelter 10 of the present invention is formed to include a bottom shell 12 and a top shell 14 where the bottom 12 and top 14 shell pieces interfit with one another to create the overall body of the shelter 10. Further, as can best be seen in FIG. 1, the bottom shell 12 of the shelter 10 is formed monolithically, as will be described in more detail below, and includes recesses 16 in the sides thereof to allow the bottom shell 12 to be placed into a pick-up truck bed 18 for the purposes of transportation. The top shell 14 is also monolithically formed and fits onto the bottom shell 12 to create a complete shelter 10 to protect the occupants of the shelter from the winter environment.

The present invention is particularly directed to a shelter 10 that is fully portable yet sturdy enough to protect occupants from the harsh winter environment typically encountered while ice fishing. The bottom shell 12 as was stated above is monolithically formed. The principal reason for forming the bottom shell 12 in this manner is to create a watertight structure. As is known in the art, this type of structure 10 is generally placed onto the surface of a frozen body of water. Often, as a result of water currents beneath the ice or simply thaw conditions encountered both early and late in the season, the strength of the ice to bear weight becomes questionable. The bottom shell 12 of the present invention is specifically formed to float should the supporting ice fail. This feature will likely save the occupants of the shelter 10 by preventing them from falling into the icy water and providing shelter and flotation for the occupants until assistance can arrive.

Further, by manufacturing the bottom shell 12 in this fashion, a strong and durable structure is formed that can tolerate a great deal of handling and moving around while requiring a minimal amount of actual weight to achieve the structural requirements. Preferably the present invention is formed using a laminate process wherein a plywood core is formed that is laminated on both sides with a fiberglass protective coating that serves to waterproof the structure and provide structural integrity. Optionally, the present invention may be formed using traditional layered fiberglass construction, molded thermoplastic sheets or sheet metal and still remain within the disclosure of the present invention.

Figure 2:
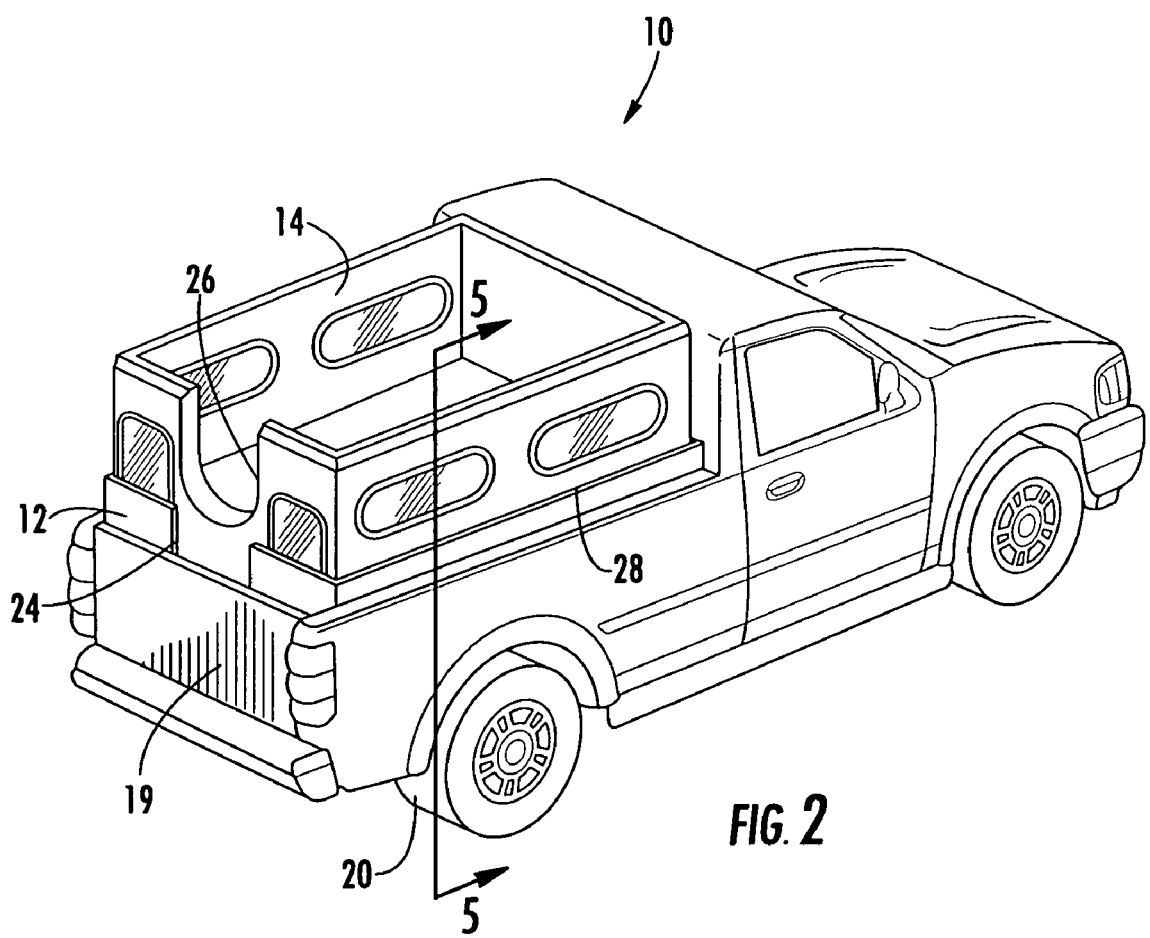
FIG. 2 is a perspective view of the portable ice fishing structure of the present invention in the bed of a pick-up truck for transportation.

Turning to FIGS. 1 and 2, to facilitate placement of the bottom shell 12 into a pick-up bed 18 as is illustrated in FIG. 2, the bottom shell 12 has channels 16 formed along its bottom longitudinal edges. The channels 16 perform two purposes. The first purpose is to allow the bottom shell 12 to be slid into a pick-up truck bed 18. As can be seen, the channels 16 extend from one end of the bottom shell 12 to a point beyond the typical positioning of the wheels 20 at the rear of the pick-up truck. As the bottom shell 12 is placed into a pick-up truck bed 18, the channels 16 provide the necessary space to allow the bottom shell 12 to slide past the wheel wells 22 that extend into the bed 18 of the pick-up truck. Once fully loaded into the pick-up truck bed 18, the tail gate 19 can be closed thereby fully retaining the bottom shell 12 in the truck. Additionally, the channels 16 form a surface within the interior of the bottom shell 12 making them serve conveniently as seating for the occupants of the shelter 10. At the rear of the bottom shell 12 an opening 24 is provided through which occupants can enter the shelter 10. It should be noted that the opening 24 does not extend to the bottom edge of the bottom shell 12 thereby providing "free board" and maintaining the water tight integrity of the bottom shell 12 should it need to float in the event of an ice failure.

Figure 3:
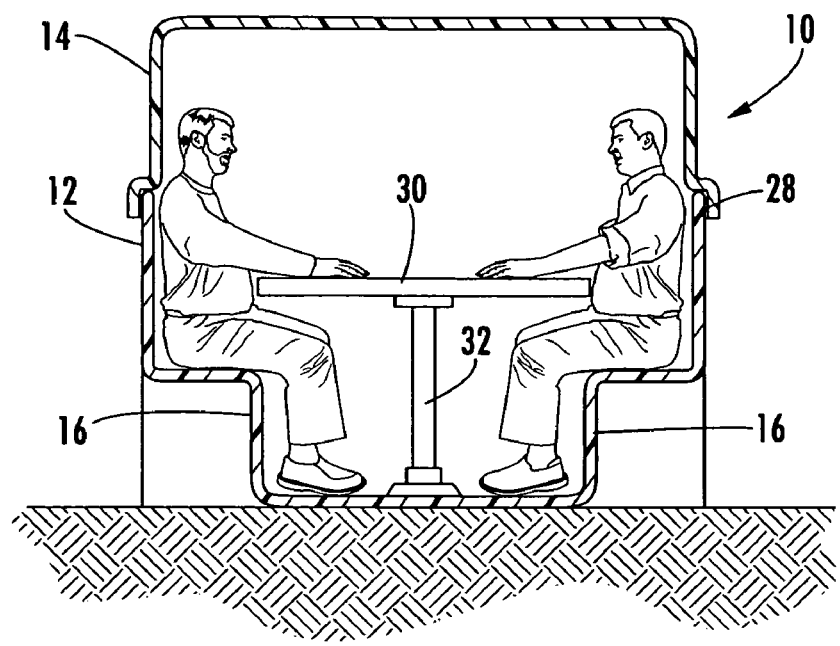
FIG. 3 is a cross sectional view of the portable ice fishing structure taken along line 3—3 of FIG. 1.
Figure 4:
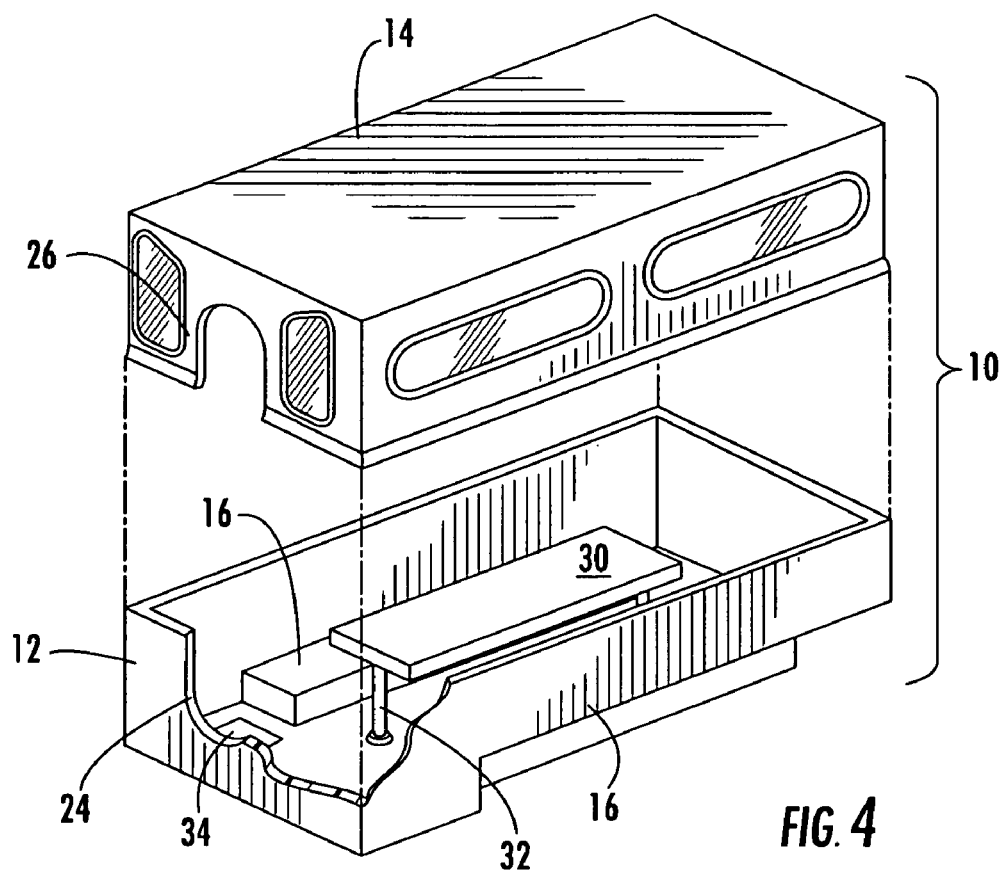
FIG. 4 is an exploded perspective view of the ice fishing structure.

Turning now to FIGS. 3 and 4, the relationship between the top shell 14 and the bottom shell 12 of the present invention is illustrated. The top shell 14 is formed to be fully removable from the bottom shell 12. It is this two shell feature that makes the present invention particularly advantageous as compared to the known prior art by giving it the portability of prior art collapsible shelters while including the durability and protection typically afforded by the larger hard walled structures. The shelter 10 of the present invention is configured in a manner that allows the outer peripheral edge of the top shell 14 to extend slightly beyond the outer edge of the bottom shell 12 thereby positively flashing the top shell 14 and the bottom shell 12 when they are in assembled relation, allowing the structure to effectively shed water. The top shell 14 is formed utilizing the same construction as described above with respect to the bottom shell 12. Specifically, the top shell 14 is formed using a laminate process wherein a plywood core is formed that is laminated on both sides with a fiberglass protective coating that serves to waterproof the structure 10 and provide structural integrity. Optionally, the present invention may be formed using traditional fiberglass layered construction, molded thermoplastic sheets or sheet metal. The rear of the top shell 14 also includes an opening 26 that corresponds to the opening 24 in the bottom shell 12 thereby forming a passage by which the occupants can enter the shelter 10. The top shell 14 is formed to be easily removable from the bottom shell 12 by simply lifting the top shell 14 off. This feature allows easy disassembly of the shelter 10 as necessary and facilitates the storing and transporting of the shelter 10 as will be described more fully below. Further, a door 27 is provided for the opening 26 in the shelter. The door 27 is mounted using hinges that are easily separable either by removing the pin or having a drop pin hinge where the top half of the hinge is retained on the bottom half by gravity thereby allowing the door 27 to be removed before separating the top shell 14 from the bottom shell 14.

In FIG. 3, the relationship between the top shell 14 and the bottom shell 12 in the assembled position deployed on the ice can be clearly seen. The top shell 14 can be seen to be resting on the side walls of the bottom shell 12 with the side walls of the top shell 14 slightly flared thereby allowing the top shell 14 to fit over the side walls of the bottom shell 12 flashing the joint 28 therebetween. The particular details of this joint may vary. The important feature is that the side walls of the top shell 14 and bottom shell 12 cooperate in a manner that prevents infiltration of water and serves to block wind from blowing through the shelter 10. Further, the bottom shell 12 can be seen to be resting in the pick-up truck bed 18 with the channels 16 providing both the necessary space to accommodate the pick-up truck wheel wells 22 as well as serving as seating for the occupants.

Figure 5:
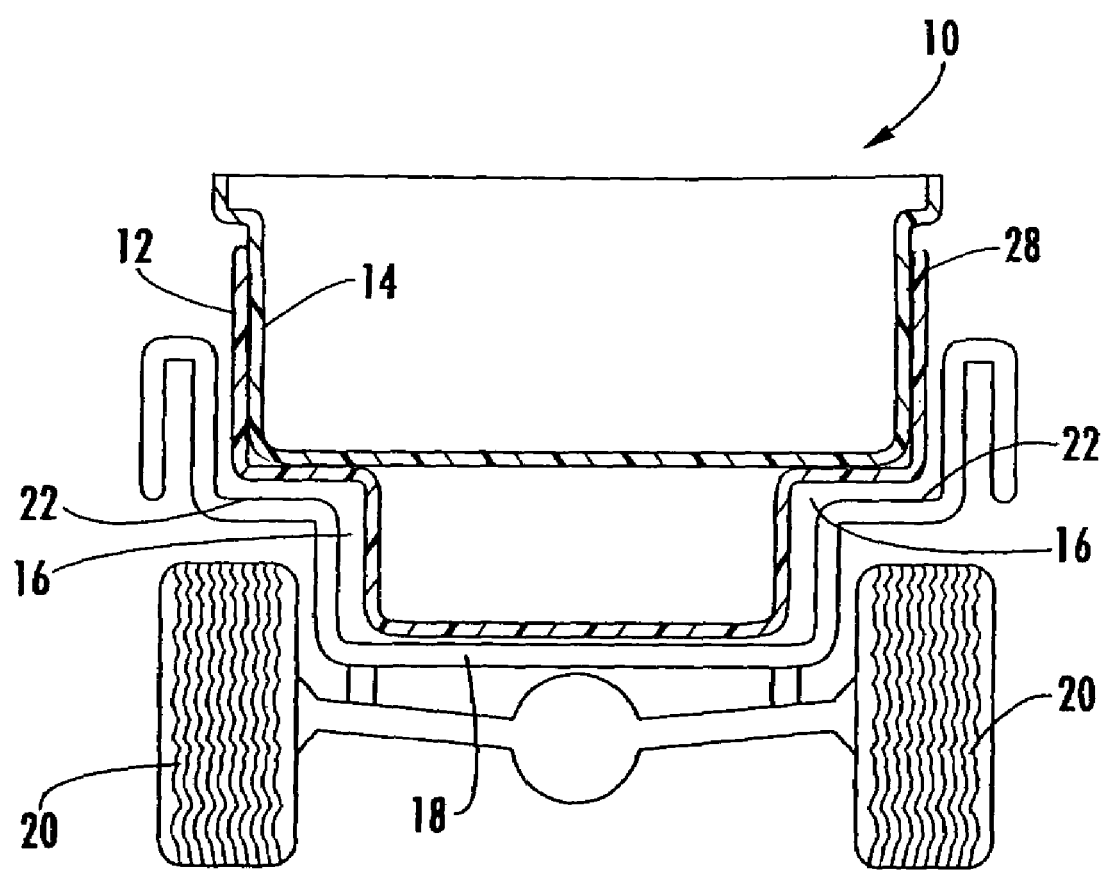
FIG. 5 is a cross sectional view of the portable ice fishing structure taken along line 5—5 of FIG. 2.

As can be best seen in the cross section in FIG. 5, the top shell 14 is shown as being inverted and placed into the bottom shell 12. This is the configuration that is utilized for storing and or transporting the shelter 10. By inverting the top shell 14 placing the top shell 14 into the bottom shell 12 in this manner, the exposed windage of the shelter 10 is greatly reduced for transport. Further, the actual volume of the space occupied by the shelter 10 is reduced, thereby reducing the space necessary to store the shelter 10 when it is not in use. This construction allows the shelter 10 to be collapsible for transport and storage. The benefit over the prior art is that all of the collapsible structures are formed using various pipe supports and tenting materials to form the top shell of the structure. When erecting such a structure, the occupant must spend a great deal of time erecting the posts and then stretching the canvas thereover. Because of the complexity of this type arrangement, such a structure is generally limited in size to a shelter for a single occupant. Should the size of the structure grow in order to accommodate more occupants, the overall structure, tenting material and connection methods become exponentially burdensome for the user to erect in the cold harsh conditions typically encountered in the ice fishing environment. In contrast, the user of the present invention simply must invert the top shell 14 and place it on the bottom shell 12 to complete the erection of the shelter 10. The size of the shelter 10 is limited only by the pickup truck bed 18 with which it will be used, but can certainly accommodate multiple occupants in any case. Further, the hard construction of the top shell 14 as contrasted with prior art tent style collapsible shelters is more resistant to the elements and is better suited at blocking the wind without flapping around therefore making the occupants more comfortable.

The tremendous advantage of the present invention can be seen in the fact that the present invention provides a shelter 10 that includes hard structure for both the top 12 and bottom 14 shell while also being lightweight and easily transportable. By making the top 12 and bottom 14 shells from hard materials, the shelter 10 is far more durable and wind resistant. This construction makes the shelter 10 far more comfortable for the occupants. Also by making the shelter 10 in two separable components, the present invention allows for easier transport and portability as compared to the hard structures known in the prior art. For use, the user simply slides the shelter 10 out of the pick-up truck bed 18 onto the surface of the ice. The top shell 14 is then turned upright and placed onto the bottom shell 2 to complete the erection of the shelter 10.

Additionally, a table 30 may be provided on the interior of the shelter 10 which is supported on legs 32. The table 30 is formed in a manner that allows the top to be easily removed for storage. The table as well various equipment and gear as desired by the occupants can be easily stored and transported along with the shelter 10 by placing the gear in the well on the floor of the bottom shell 12 between the seats 16. When the top shell 14 is removed and inverted into the bottom shell 12 it rests on the seats 16 making this well area an optimum storage compartment. Near the rear of the bottom shell 12, the floor of the bottom shell 12 is shown to include a small hole 34 therein. This hole 34 is optional and provides the occupants of the shelter 10 the ability to set up their ice fishing directly within the confines of the shelter 10. The occupants can utilize the hole 34 in the shelter 10 to access the ice surface and deploy their fishing gear.

It can therefore be seen that the present invention provides a novel construction for a portable shelter 10 that enhances the safety and comfort of the occupant while demonstrating a large advancement over the prior art. Further, the present invention includes features, namely a hard constructed top 14 and bottom 12 shell member that facilitate a durable and highly weather resistant structure while allowing for easy erection of the shelter 10 while also being collapsible for transport and storage. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A portable shelter comprising:
    a lower rigid shell, said lower shell having a bottom wall and lower side walls extending upwardly from said bottom wall, said lower side walls including a top peripheral edge, wherein said lower shell is waterproof and capable of floating;
    an upper rigid shell having a top wall and upper side walls extending downwardly from said top wall, said upper side walls including a bottom peripheral edge, said upper shell being configured to be received in mated relation with said lower shell, wherein complementary mating formations on said bottom peripheral edge of said upper shell and on said top peripheral edge of said lower side walls cooperate to align and seal said upper shell and said lower shell; and
    at least one opening in said upper and lower side walls whereby a person can enter said shelter;
    said shelter having a transport configuration wherein said upper shell is removed from said lower shell, said upper shell is inverted wherein said upper side walls extend upwardly from said top wall, and said upper shell is placed within said lower shell for transport and storage.

2. The portable shelter of claim 1, wherein said lower shell is adapted for placement in a pick-up truck bed having wheel well structures therein, said lower shell including two channels extending at least partially along two parallel sides thereof, said channels being sized and configured to allow said lower shell to slide into said pick-up truck bed between said wheel well structures.

3. The portable shelter of claim 2, wherein said channels form structures on the interior of said lower shell, said structures suitable for use as seating by the occupants of said shelter.

4. The portable shelter of claim 1, further comprising a table mounted to said bottom wall on the interior of said lower shell.

5. The portable shelter of claim 1, further comprising a storage compartment integrally formed with said bottom wall and said lower side walls of said lower shell.

6. The portable shelter of claim 1, wherein said upper and lower shells are formed using a technique selected from the group consisting of: cored fiberglass construction, laminate fiberglass construction, solid fiberglass construction, thermoplastic sheet molding, waterproofed plywood construction and combinations thereof.

7. The portable shelter of claim 1, further comprising:
    an opening in the bottom wall of said lower shell to provide the occupants of said shelter access to the surface of the terrain on which the shelter is placed.

* * * * *